United States Patent
Kishioka (10) Patent No.: US 7,200,099 B2
(45) Date of Patent: Apr. 3, 2007

(54) LOW VOLTAGE DIFFERENTIAL SIGNAL TRANSMITTING CIRCUIT AND OPTICAL DISC RECORDING APPARATUS

(75) Inventor: Toshiki Kishioka, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 558 days.

(21) Appl. No.: 10/796,870

(22) Filed: Mar. 9, 2004

(65) Prior Publication Data
US 2004/0257963 A1 Dec. 23, 2004

(30) Foreign Application Priority Data
Mar. 10, 2003 (JP) .............................. 2003-063547

(51) Int. Cl.
*G11B 7/00* (2006.01)
(52) U.S. Cl. .................... 369/120; 369/116; 326/30; 327/51
(58) Field of Classification Search ............... 369/120, 369/121, 122, 116, 47.5, 47.51; 326/30, 326/83, 32, 86; 327/51, 70, 108, 210
See application file for complete search history.

(56) References Cited

U.S. PATENT DOCUMENTS 6,903,580 B2 * 6/2005 Nagahori ................... 327/108

FOREIGN PATENT DOCUMENTS

JP        2000-134082        5/2000

* cited by examiner

*Primary Examiner*—Nabil Hindi
(74) *Attorney, Agent, or Firm*—Cooper & Dunham LLP (57) ABSTRACT

A low voltage differential signaling transmitting circuit includes a driver circuit that outputs currents as differential signals from its pair of output terminals in accordance with a digital signal input to its input terminal, a bias circuit that supplies the driver circuit with a bias current so as to adjust values of the currents output from the driver circuit, a current/voltage conversion circuit that converts the currents output from the pair of output terminals of the driver circuit into voltages, and a receiver circuit that compares the voltages with each other and outputs a signal representing a result of the comparison. The bias circuit and the current/voltage conversion circuit are arranged on a same semiconductor chip.

15 Claims, 5 Drawing Sheets

FIG. 5

LOW VOLTAGE DIFFERENTIAL SIGNAL TRANSMITTING CIRCUIT AND OPTICAL DISC RECORDING APPARATUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present specification relates generally to a low voltage differential signal ("LVDS") transmitting circuit and an optical disc recording apparatus employing the LVDS transmitting circuit, and particularly to an LVDS transmitting circuit and optical disc recording apparatus capable of suppressing unevenness of an output voltage.

2. Discussion of the Background Art

In accordance with the recent downsizing and speeding up of an integrated circuit, LVDS circuits are becoming more widely used as a signal transmission device. In order to handle a differential signal of small amplitude, it is generally desirable for a low voltage differential signal transmitting circuit ("LVDS circuit") to have a prescribed precision so as to transmit precisely such a small differential signal between a driver circuit and a receiver circuit.

In a semiconductor integrated circuit, performance generally varies in accordance with unevenness of a process and changes in temperature and power supply voltage or the like. As a result, precision is difficult to obtain in transmitting a small signal and is often a problem. In order to resolve such a problem, Japanese Patent Application Laid Open No. 2000-134082 proposes a technology in which a MOSFET is employed in each of a plurality of output circuits, each handling an LVDS so as to adjust a current that drives a driver. Further, one of the plurality of output circuits is utilized as a dummy in which a terminal resistor is connected to output terminals thereof so as to form High and Low level signals. A prescribed control signal capable of controlling the MOSFET to generate and output the High and Low level signals of the prescribed levels is generated. The control signal is then supplied to the MOSFETs included in the remaining output circuits in order to automatically adjust respective currents.

By enabling adjustment of a current value in such a way at a signal transmission site, amplitude of a differential voltage output from a driver circuit can conventionally be controlled to be constant. However, a particular circuit is necessitated for adjusting a current, and as a result a number of elements increases in the circuit.

SUMMARY

Accordingly, an object of the present invention is to address and resolve the above-noted and other problems and provide a new and improved low voltage differential signaling transmitting circuit. The above and other objects are achieved according to the present application by providing a novel low voltage differential signaling transmitting circuit including a driver circuit that outputs currents as differential signals from a pair of output terminals thereof in accordance with a digital signal input through an input terminal thereof. A bias circuit is provided to supply the driver circuit with a bias current so as to adjust the currents output from the driver circuit. A current/voltage conversion circuit is also provided to convert the currents output from the pair of output terminals of the driver circuit into voltages. A receiver circuit is provided to compare the voltages with each other and output a signal representing a result of the comparison. In a preferred embodiment, the bias circuit and the current/voltage conversion circuit are arranged on a same semiconductor chip.

In another embodiment, the bias circuit and the current/voltage conversion circuit are formed by a same semiconductor manufacturing process.

In yet another embodiment, the driver circuit is formed on a semiconductor chip, and said bias circuit, the current/voltage conversion circuit and the receiver circuit are formed on another semiconductor chip.

In yet another embodiment, the driver circuit, the bias circuit and the current/voltage conversion circuit are formed on a semiconductor chip, and the receiver circuit is formed on another semiconductor chip.

In yet another embodiment, the driver circuit is formed on a semiconductor chip, the bias circuit and the current/voltage conversion circuit are formed on another semiconductor chip, and the receiver circuit is formed on still another semiconductor chip.

In yet another embodiment, at least the driver circuit, the bias circuit, the current/voltage conversion circuit and the receiver circuit collectively form a multiple module.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENTS OF THE PRESENT DISCLOSURE

Referring now to the drawings, wherein like reference numerals and marks designate identical or corresponding parts throughout several figures, a first embodiment of an LVDS circuit of a multiple chip module (hereinafter referred to as an MCM) is illustrated exemplarily in FIG. 1. As shown, the LVDS transmitting circuit 1 includes, but is not limited to, a driver circuit 2 which outputs, from its pair of output terminals, a current in accordance with a digital signal input through its input terminal IN, a current/voltage conversion circuit 3 which converts the current output from the driver circuit 2 into a voltage, and a receiver circuit 4 which compares a pair of signal voltages with each other converted by the current/voltage conversion circuit 3 and outputs a binary signal representing a result of the comparison. Also included may be a bias circuit 5 which supplies a bias current ib and controls the driver circuit 2 to output a prescribed amount of current.

Figure 1:
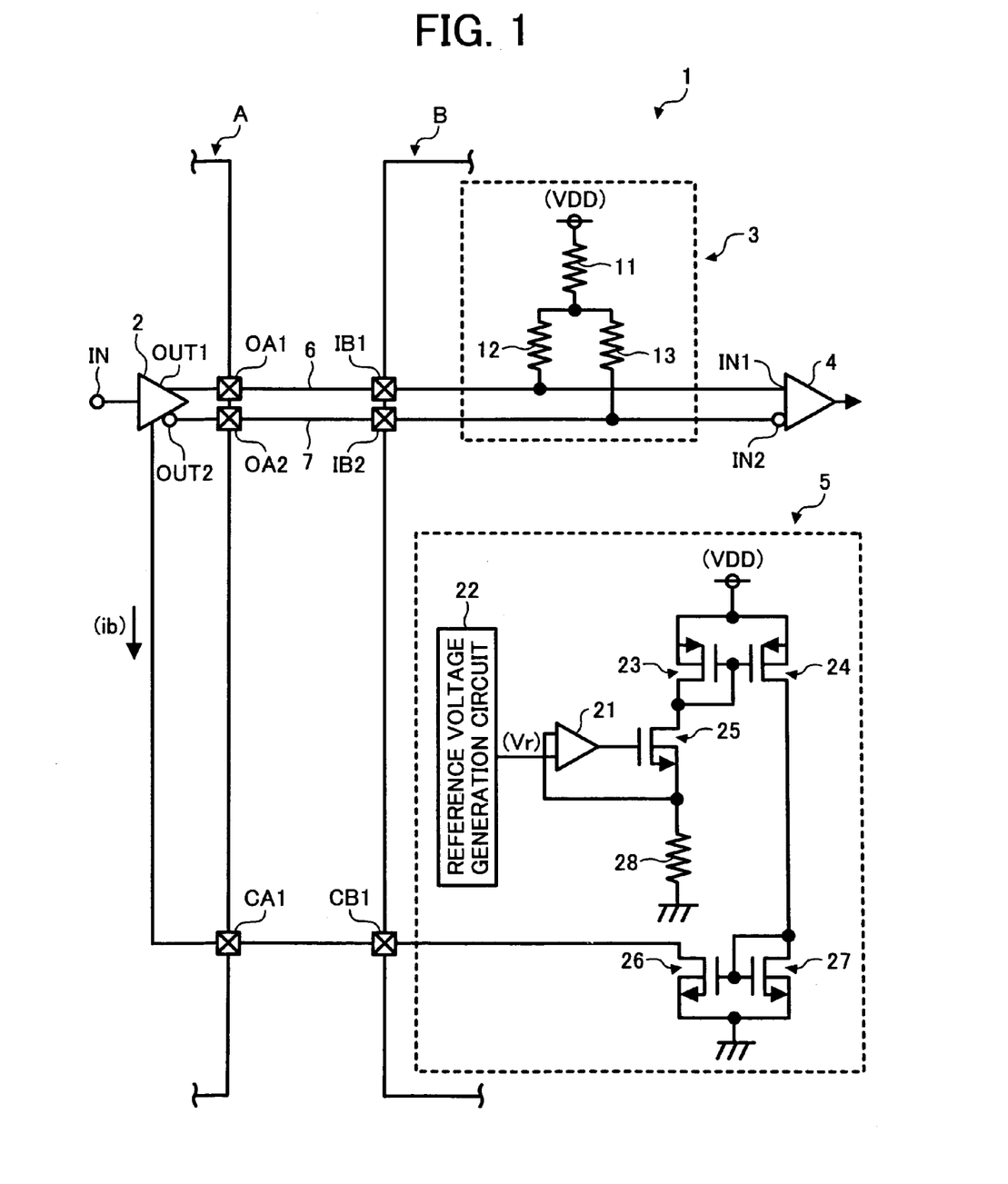
FIG. 1 illustrates an exemplary LVDS circuit according to one embodiment of the present invention.

As shown in FIG. 1, the driver circuit 2 is preferably formed on a semiconductor chip A. The current/voltage conversion circuit 3, the receiver circuit 4 and the bias circuit 5 may be formed on a chip B. The driver circuit 2 preferably includes a pair of output terminals OUT1 and OUT2. When a high level signal is input through input IN of the driver circuit, a current flows into the output terminal OUT2 in accordance with a bias current ib from the bias circuit 5, and at the same time a current stops flowing from the output terminal OUT1.

Further, when a low level signal is input to the driver circuit 2, a prescribed amount of current flows through the output terminal OUT1 in accordance with a bias current ib from the bias circuit 5. Simultaneously, a current stops flowing through the output terminal OUT2. Preferably, the output terminal OUT1 is connected to an output terminal OA1 of the semiconductor arranged at one end of the semiconductor chip A, and the output terminal OUT2 is connected to an output terminal OA2 of the semiconductor chip A arranged at the same end.

The output terminal OA1 of the semiconductor chip A may be connected to one of the input terminals of the receiver circuit 4 by a signal line 6 via an input terminal IB1 of the semiconductor chip B arranged at one end of the semiconductor chip B, and the output terminal OA2 of the semiconductor chip A may be connected to another one of the input terminals of the receiver circuit 4 by a signal line 7 via an input terminal IB2 of the semiconductor chip B arranged at the same end of the semiconductor chip B.

The current/voltage conversion circuit 3 is preferably formed from a plurality of resistors 11 to 13 in such a manner that the resistors 11 and 12 are serially connected between the power supply voltage VDD and the input terminal IB1, and the resistor 13 is connected between a connection section connecting these resistors 11 and 12 and the input terminal IB2. The bias circuit 5 is preferably formed from a voltage comparator 21, a reference voltage generation circuit 22 that generates and outputs a prescribed reference voltage Vr, a pair of PMOS transistors 23 and 24, a pair of NMOS transistors 25 to 27, and a resistor 28. The PMOS transistors 23 and 24 may form, for example, a current mirror circuit. The PMOS transistor 23, the NMOS transistors 25, and the resistor 28 are preferably serially connected. A gate of the NMOS transistor 25 is preferably connected to an output terminal of the voltage comparator 21. Respective gates of the PMOS transistors 23 and 24 may be connected to each other, and a connection section of the two may be connected to a drain of the PMOS transistor 23.

A connection section of the NMOS transistor 25 and the resistor 28 is preferably connected to one of input terminals of the voltage comparator 21. The reference voltage Vr may be input through the other input terminal. The NMOS transistors 26 and 27 preferably form a current mirror circuit. Respective gates of the NMOS transistors 26 and 27 are preferably connected to each other, and a connection section of the gates may be connected to a drain of the NMOS transistor 27. A drain of the NMOS transistor 26 preferably serves as an output terminal of the bias circuit 5, and is connected to the driver circuit 2 via connection terminals CB1 and CA1 arranged at respective ends of the semiconductor chips B and A, respectively.

Figure 2:
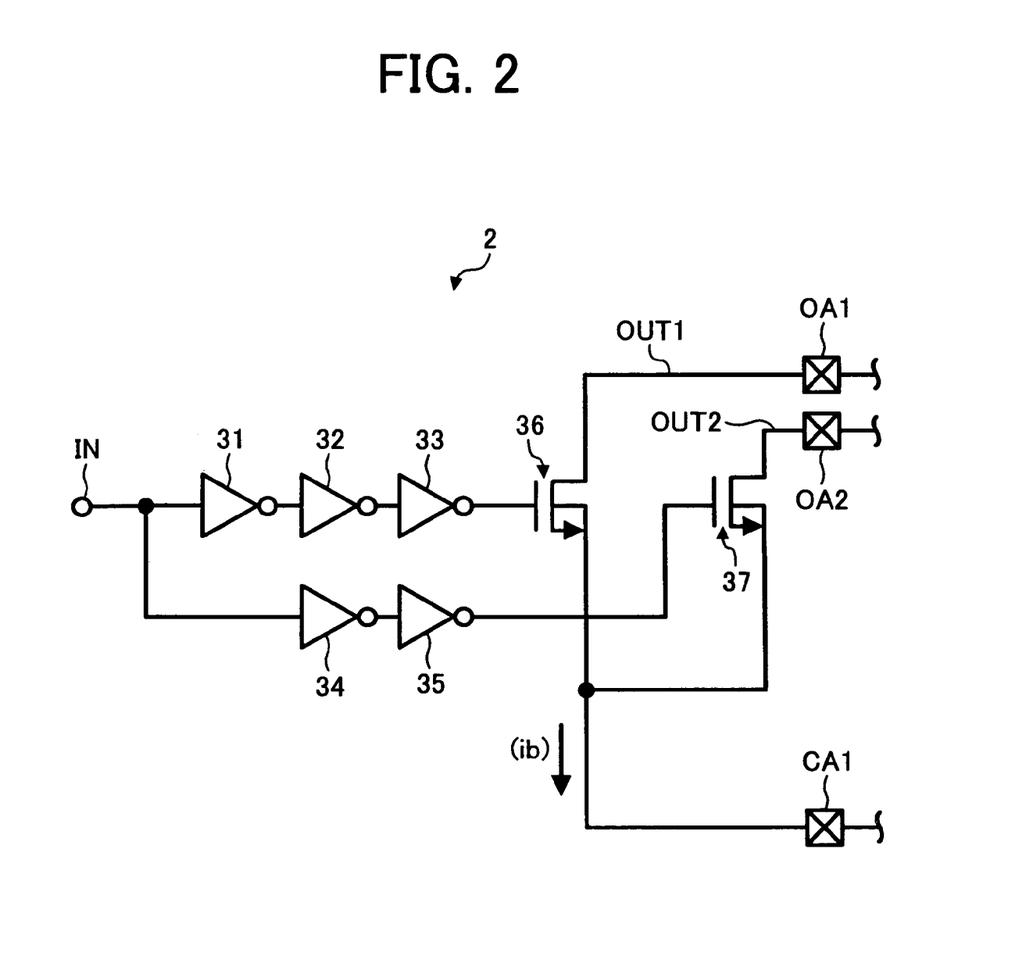
FIG. 2 illustrates an exemplary driver circuit employed in the LVDS circuit illustrated in FIG. 1.

Referring now to FIG. 2, the driver circuit 2 includes, but is not limited to, invertors 31 to 35 and NMOS transistor 36 and 37. The NMOS transistor 36 may connect to the output terminal OA1 and the connection terminal CA1. The NMOS transistor 37 may connect to the output terminal OA2 and the connection terminal CA1. Respective drains of the NMOS transistors 36 and 37 preferably serve as the output terminals OUT1 and OUT2. The inverters 31 to 33 may be serially connected between the input terminal IN of the driver circuit 2 and a gate of the NMOS transistor 36. Similarly, the inverters 34 and 35 may be serially connected between the input terminal IN and a gate of the NMOS transistor 37.

In such a configuration, when a low level signal is input through the input terminal IN, the NMOS transistor 36 may be turned ON and the NMOS transistor 37 is turned OFF. Thus, a bias current ib preferably flows through resistors 11 and 12, the input terminal IB1, the signal line 6, the output terminal OA1, the NMOS transistor 36, the connection terminal CA1, the connection terminal CB1, and the NMOS transistor 26. In contrast, a current does not flow through the output terminal OA2 at the time.

Thus, the voltage of the input terminal IN2 is larger than that of the input terminal IN1. As a result, a low level signal may be output from the receiver circuit 4. Specifically, when, for example, a power supply voltage VDD is 1.8 volts, values of the resistors 11, 12, and 13 are 180 ohms, 110 ohms, and 110 ohms, respectively, the reference voltage Vr is 1.2 volts, a value of the resistor 28 is 12 kilo-ohms, a drain current flowing from the PMOS transistor 24 is five times the current flowing from the PMOS transistor 23, a drain current flowing into the NMOS transistor 26 is eight times the current flowing into the NMOS transistor 27, and a current of 100 microamperes flows into the resistor 28, a current of 500 microamperes is preferably output from the PMOS transistor 24. Simultaneously, a current of 4 miliamperes preferably flows into the drain of the NMOS transistor 26.

In view of these, the driver circuit 2 is designed to take 4 milli-amperes in through only one of two differential transmission routes, i.e., an output terminal OUT1. If a current of 4 milli-amperes is taken into the output terminal OUT1, a positive side input voltage of the receiver circuit 4 (i.e., a voltage of the input IN1) is calculated by the following formula:

$$1.8V - (4\ mA \times 290\Omega) = 0.64V$$

In addition, a negative side input voltage is calculated by the following formula:

$$1.8V - (4\ mA \times 180\Omega) = 1.08V$$

The receiver circuit 4 thereby may output a low level signal.

In contrast, when a high level signal is input through the input terminal IN, the NMOS transistor 36 may be turned OFF, and the NMOS transistor 37 may be turned ON. Thus, a bias current "ib" preferably flows through the resistors 11 and 13, the input terminal IB2, the signal line 7, the output terminal OA2, the NMOS transistor 37, the connection terminal CA1, the connection terminal CB1, and the NMOS transistor 26. However, a current does not flow through the output terminal OA1.

Thus, the voltage of the input terminal IN1 maybe larger than that of the input terminal IN2. As a result, a high level signal may be output from the receiver circuit 4. Similar to the case when the high level signal is input to the input terminal IN, the driver circuit 2 is designed to take a current of 4 milli-amperes in from one of two differential transmission routes, i.e., the output terminal OUT2. If a current of 4 milli-amperes is taken into the output terminal OUT2, a voltage of the input terminal IN2 is calculated by the following formula:

$$1.8V-(4\ mA \times 290\Omega)=0.64V$$

A voltage of the input terminal IN1 is calculated by the following formula:

$$1.8V-(4\ mA \times 180\Omega)=1.08V$$

The receiver circuit 4 thereby may output a high level signal.

If a resistance of the semiconductor chip B is manufactured smaller by 10% than a target scale due to unevenness of a process, the resistor 11 may be down to 162 ohms from 180 ohms, and the resistors 12 and 13, down to 99 ohms from 110 ohms. If the bias circuit 5 is formed on the semiconductor chip A, a high level voltage to be input to the receiver circuit 4 may be calculated by the following formula:

$$1.8V-(4\ mA \times 162\Omega)=1.152V$$

A low level voltage to be input to the receiver circuit 4 may be calculated by the following formula:

$$1.8V-(4\ mA \times 261\Omega)=0.756V$$

Namely, these values deviate by 0.072V from the high level voltage value of 1.08V, and 0.116 v from the low level of 0.64V, respectively.

If the bias circuit 5 is formed on the semiconductor chip B, since the resistor 28 similarly shrinks by 10%, its resistance value is down to 10. 8 kΩ from 12 kΩ. In addition, a current flowing through the resistor 28 is up to 111 microamperes from 100 microamperes. Finally, a bias current ib flown to the driver circuit 2 is up to 4.44 mA from 4 mA. Thus, a high level signal voltage received by the receiver circuit 4 is calculated by the following formula:

$$1.8V-(4.44\ mA \times 162\Omega)=1.081V$$

A low level signal voltage received by the receiver circuit 4 is calculated by the following formula:

$$1.8V-(4.44\ mA \times 261\Omega)=0.641V$$

Thus, a deviation value from the prescribed high and low levels may be small enough, for example, down to 0.001V.

Another embodiment is now described, in a context that a power supply voltage VDD of the semiconductor chip B expands by 10% due to the earlier mentioned reasons. Specifically, the supply voltage VDD supplied to the bias circuit 5 may become 1.98V in such a situation. If a bias circuit 5 is formed on a semiconductor chip A, the high level voltage received by the receiver circuit 4 may be calculated by the following formula:

$$1.98V-(4mA \times 180\Omega)=1.26V$$

A low level voltage received by the receiver circuit 4 may be calculated by the following formula:

$$1.98V-(4mA \times 290\Omega)=0.82V$$

Thus, these values deviate from the high voltage value of 1.08V and low level voltage value of 0.64V by 0.18V, respectively.

In contrast, if the bias circuit 5 is formed on the semiconductor chip B, since the power supply voltage VDD also expands by 10%, a voltage applied to the resistor 28 is up to 1.32V from 1.2V. Also, a current flowing to the resistor 28 is up to 110 microamperes from 100 microamperes. A bias current ib is up to 4.44 mA. Thus, a high level signal voltage received by the receiver circuit 4 is calculated by the following formula:

$$1.98V-(4.4mA \times 180\Omega)=1.188V$$

A low level signal voltage received by the receiver circuit 4 is calculated by the following formula:

$$1.98V-(4.4mA \times 290\Omega)=0.704V$$

As apparent from the calculation results, deviation values from the prescribed high and low levels may be 0.108V and 0.064V, respectively. Thus, by arranging the current/voltage conversion circuit 3 and the bias circuit 5 on the same semiconductor chip, a performance of the LVDS circuit can be hardly affected by various changes in process, temperature and power supply voltage.

Figure 3:
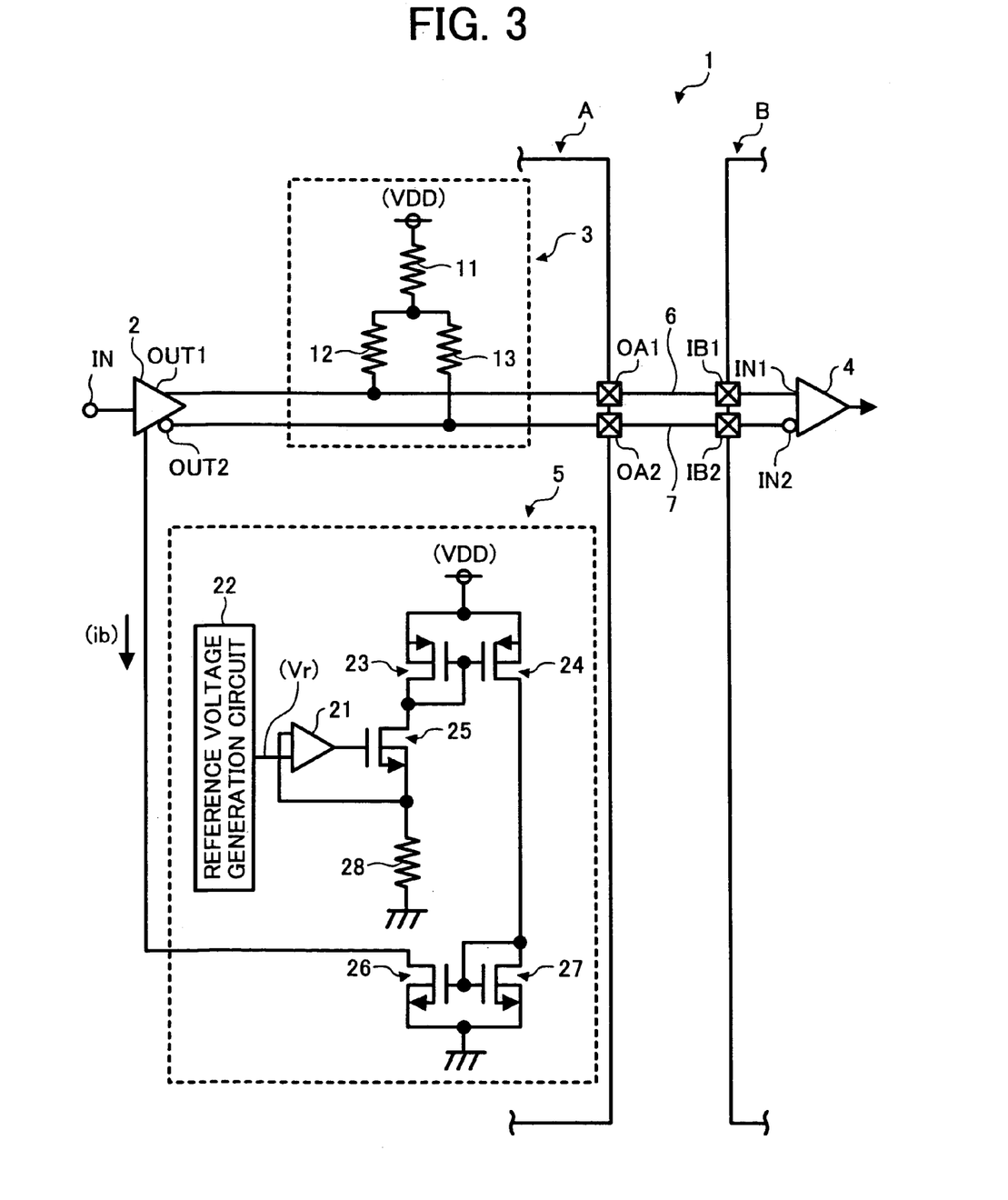
FIG. 3 illustrates an exemplary LVDS circuit according to another embodiment of the present invention.

Further, as shown in FIG. 3, both the current/voltage conversion circuit 3 and the bias circuit 5 can be arranged on a semiconductor chip A, wherein corresponding sections operate in a substantially similar manner as in FIG. 1.

Figure 4:
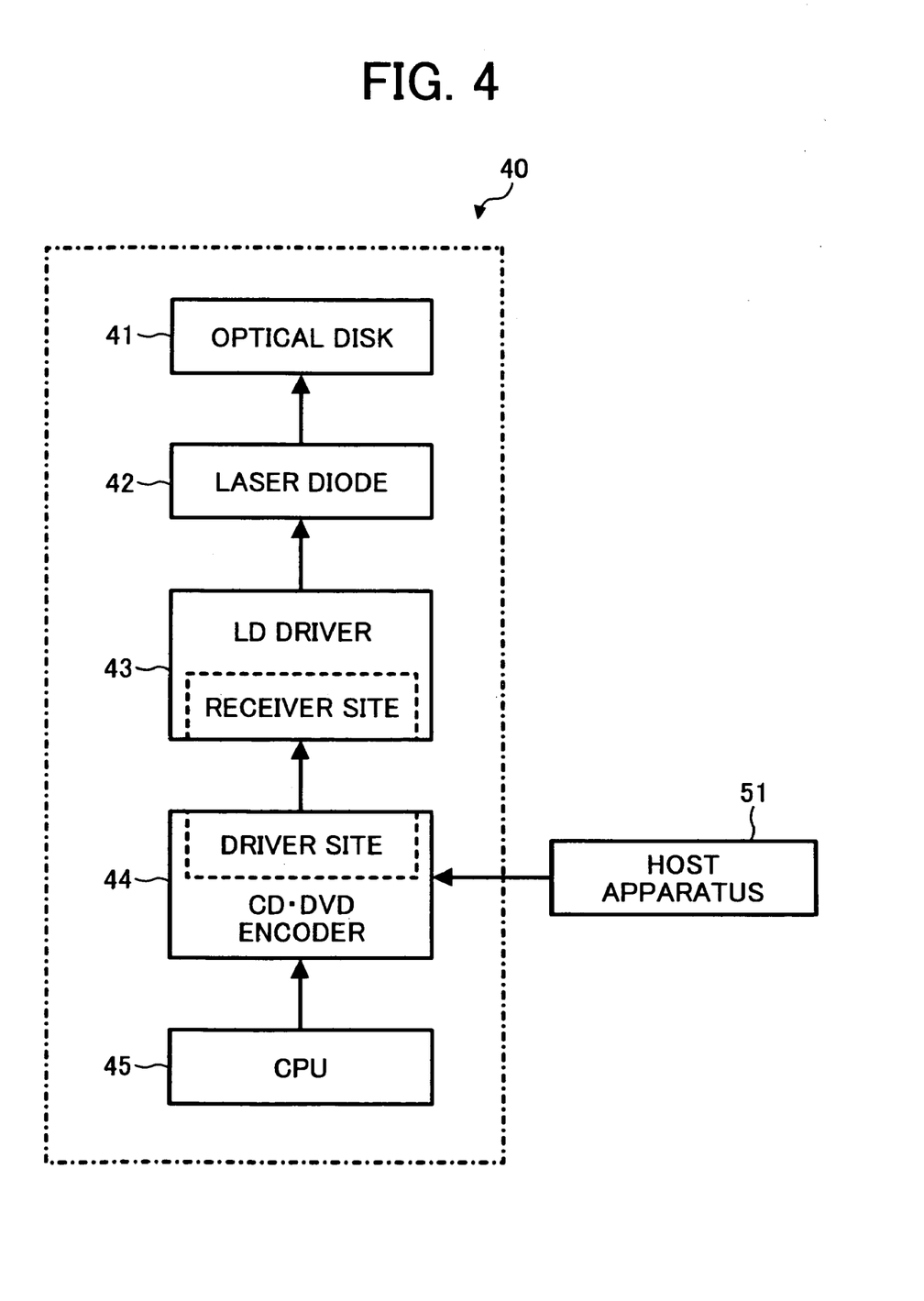
FIG. 4 is a schematic block diagram illustrating an exemplary optical disc recording apparatus according to still another embodiment employing the LVDS circuit of FIG. 1 or FIG. 2.

Referring now to FIG. 4, an exemplary optical recording apparatus of still another embodiment employing an LVDS circuit 1 is described.

As shown, an optical disc recording apparatus 40 includes, but is not limited to, a laser diode 42 which records data onto an optical disc 41 by irradiating a laser light, an LD driver 43 which controls the laser diode 42 to operate in accordance with input data, a CD/DVD encoder 44 which encodes and outputs, to the LD driver 43, writing use data which is input from a host apparatus 51 (such as a personal computer) and is written onto the optical disc 41, and a CPU 45 which controls operation of the CD/DVD encoder 44. Such a LD driver 43 may serve as a semiconductor laser driving control section. The CD/DVD encoder 44 may serve an encode section.

The LVDS circuit is preferably used when a data signal is output from the CD/DVD encoder 44 to the LD driver 43. Specifically, when the LVDS circuit of FIG.1 is employed, the driver circuit 2 is preferably used in the CD/DVD encoder 44, and the current/voltage conversion circuit 3, the receiver circuit 4, and the bias circuit 5 may be used in the input circuit of the LD driver 43. Both the CD/DVD encoder 44 and the LD driver 43 may be connected by a pair of signal lines 6 and 7. In the preferred embodiment, the CD/DVD encoder 44 may be arranged on the semiconductor chip A. The LD driver 43 may be arranged on the semiconductor chip B. The semiconductor chips A and B may constitute an MCM formed on a single module.

Further, the current/voltage conversion circuit 3 and the bias circuit 2 can be arranged on the same chip and/or formed by the same process.

Figure 5:
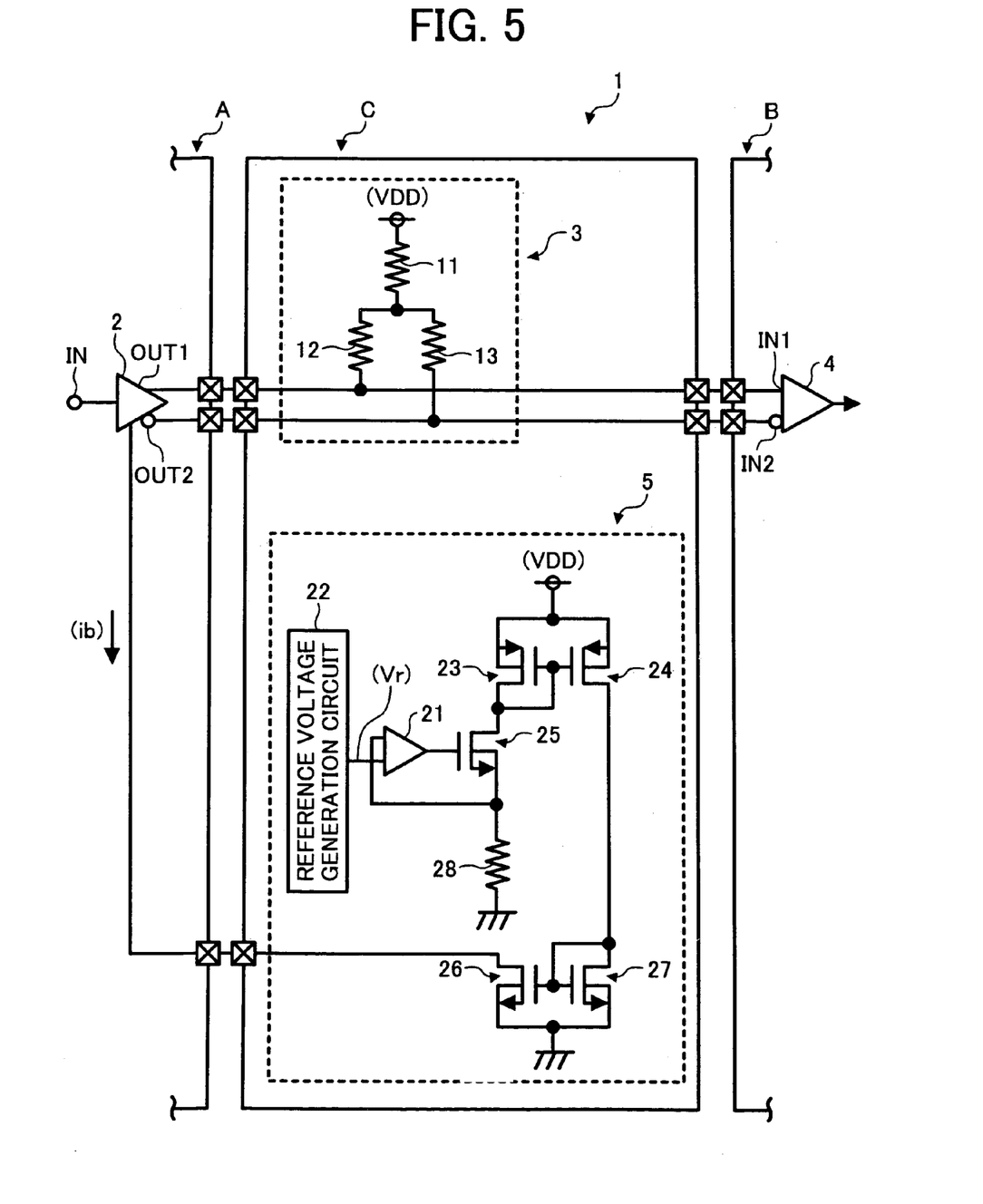
FIG. 5 illustrates an exemplary LVDS circuit according to still another embodiment of the present invention.

For example, the driver circuit 2 can be formed on the semiconductor chip A, the receiver circuit 4 can be formed on the semiconductor chip B, and the current/voltage conversion circuit 3 and the bias circuit 5 can be formed on a semiconductor chip C as shown in FIG. 5.

Accordingly, in the LVDS transmitting circuit according to the preferred embodiment, the current/voltage conversion circuit 3 which converts a current output from a driver circuit 2 into a voltage, and the bias circuit 5 which controls a current value output from the driver circuit 2 are preferably arranged on the same chip and/or formed by the same process.

Numerous additional modifications and variations of the present invention are possible in light of the above teachings. It is therefore to be understood that within the scope of the appended claims, the present invention may be practiced otherwise than as specifically described herein.

This application claims priority under 35 USC §119 to Japanese Patent Application No. 2003-063547 filed on Mar. 10, 2003, the entire contents of which are herein incorporated by reference.

What is claimed is:

1. A low voltage differential signaling transmitting circuit comprising:
    a driver circuit configured to output currents as differential signals from a pair of output terminals of the driver circuit in accordance with a digital signal input through an input terminal of the driver circuit;
    a bias circuit configured to supply the driver circuit with a bias current, said bias current adjusting values of the currents output from the driver circuit;
    a current/voltage conversion circuit configured to convert the currents output from the pair of output terminals of the driver circuit into voltages; and
    a receiver circuit configured to compare the voltages with each other and output a signal representing a result of the comparison;
    wherein said bias circuit and the current/voltage conversion circuit are arranged on a same semiconductor chip.

2. The low voltage differential signal transmitting circuit as claimed in claim 1, wherein said bias circuit and the current/voltage conversion circuit are formed by a same semiconductor manufacturing process.

3. A low voltage differential signal transmitting circuit comprising:
    a driver circuit configured to output currents as differential signals from a pair of output terminals of the driver circuit in accordance with a digital signal input through an input terminal of the driver circuit;
    a bias circuit configured to supply the driver circuit with a bias current, said bias current adjusting values of the currents output from the driver circuit;
    a current/voltage conversion circuit configured to convert the currents output from the pair of output terminals of the driver circuit into voltages; and
    a receiver circuit configured to compare the voltages with each other and output a signal representing a result of the comparison;
    wherein said bias circuit and the current/voltage conversion circuit are formed by a same semiconductor manufacturing process.

4. The low voltage differential signal transmitting circuit as claimed in any one of claims 1 to 3, wherein the driver circuit is formed on a semiconductor chip, and said bias circuit, the current/voltage conversion circuit and the receiver circuit are formed on another semiconductor chip.

5. The low voltage differential signal transmitting circuit as claimed in any one of claims 1 to 3, wherein said driver circuit, the bias circuit, and the current/voltage conversion circuit are formed on a semiconductor chip, and the receiver circuit is formed on another semiconductor chip.

6. The low voltage differential signal transmitting circuit as claimed in any one of claims 1 to 3, wherein said driver circuit is formed on a first semiconductor chip, and the bias circuit and the current/voltage conversion circuit are formed on a second semiconductor chip, and the receiver circuit is formed on a third semiconductor chip.

7. The low voltage differential signal transmitting circuit as claimed in claim 5, wherein at least said driver circuit, the bias circuit, the current/voltage conversion circuit and the receiver circuit collectively form a multiple module.

8. An optical disc recording apparatus connected to a host device, said optical disc recording apparatus comprising:
    an encoding device configured to encode writing use data input from the host device into a data signal; and
    a semiconductor laser driving control device configured to control driving of a semiconductor laser, said semiconductor laser being irradiated to the optical disc in accordance with the data signal;
    wherein an output circuit is provided in said encoding device, an input circuit is provided in said semiconductor laser driving control device, and said output and input circuits collectively form a LVDS circuit, said LVDS circuit including:
    a driver circuit configured to output currents as differential signals from a pair of output terminals of the driver circuit in accordance with a digital signal input through an input terminal of the driver circuit;
    a bias circuit configured to supply the driver circuit with a bias current, said bias current adjusting values of the currents output from the driver circuit;
    a current/voltage conversion circuit configured to convert the currents output from the pair of output terminals of the driver circuit into voltages; and
    a receiver circuit configured to compare the voltages with each other and output a signal representing a result of the comparison;
    wherein said bias circuit and the current/voltage conversion circuit are formed on a same semiconductor chip.

9. The optical disc recording apparatus as claimed in claim 8, wherein said bias circuit and the current/voltage conversion circuit are formed by a same semiconductor manufacturing process.

10. An optical disc recording apparatus connected to a host device, said optical disc recording apparatus comprising:
    an encoding device configured to encode writing use data input from the host device into a data signal; and
    a semiconductor laser driving control device configured to control driving of a semiconductor laser irradiated to an optical disc in accordance with the data signal;
    wherein an output circuit is provided in said encoding device, an input circuit is provided in said semiconductor laser driving control device, and said output and input circuits collectively form a LVDS circuit, said LVDS circuit including;
    a driver circuit configured to output currents as differential signals from a pair of output terminals of the driver circuit in accordance with a digital signal input through an input terminal of the driver circuit;
    a bias circuit configured to supply the driver circuit with a bias current, said bias current adjusting values of the currents output from the driver circuit;
    a current/voltage conversion circuit configured to convert the currents output from the pair of output terminals of the driver circuit into voltages; and
    a receiver circuit configured to compare the voltages with each other and output a signal representing a result of the comparison;
    wherein said bias circuit and the current/voltage conversion circuit are formed by a same semiconductor manufacturing process.

11. The optical disc recording apparatus according to any one of claims 8 to 10, wherein the driver circuit is formed on a semiconductor chip, and said bias circuit, the current/voltage conversion circuit and the receiver circuit are formed on another semiconductor chip.

12. The optical disc recording apparatus according to any one of claims 8 to 10, said driver circuit the bias circuit, and the current/voltage conversion circuit are formed on a semiconductor chip, and the receiver circuit is formed on another semiconductor chip.

13. The optical disc recording apparatus according to any one of claims 8 to 10, wherein said driver circuit is formed on a first semiconductor chip, the bias circuit and the current/voltage conversion circuit are formed on a second semiconductor chip, and the receiver circuit is formed on a third semiconductor chip.

14. The optical disc recording apparatus according to any one of claims 8 to 10, wherein at least said driver circuit, the bias circuit, the current/voltage conversion circuit and the receiver circuit collectively form a multiple module.

15. The low voltage differential signal transmitting circuit of claim 6, wherein at least said driver circuit, the bias circuit, the current/voltage conversion circuit and the receiver circuit collectively form a multiple module.

* * * * *